United States Patent
Klein et al.

(10) Patent No.: US 12,013,877 B2
(45) Date of Patent: Jun. 18, 2024

(54) INDUSTRY STANDARD INTERFACE FOR MAINTENANCE OF ENTERPRISE SYSTEMS

(71) Applicant: ADP, Inc., Roseland, NJ (US)

(72) Inventors: Eitan Klein, New York, NY (US); Richard Noad, New York, NY (US); Dan Bar-Lev, New York, NY (US); Norman Guillaume Azoulay, New York, NY (US)

(73) Assignee: ADP, Inc., Roseland, NJ (US)

( * ) Notice: Subject to any disclaimer, the term of this patent is extended or adjusted under 35 U.S.C. 154(b) by 538 days.

(21) Appl. No.: 16/295,313

(22) Filed: Mar. 7, 2019

(65) Prior Publication Data

US 2020/0285656 A1    Sep. 10, 2020

(51) Int. Cl.
| | |
|---|---|
| G06F 16/00 | (2019.01) |
| G06F 7/00 | (2006.01) |
| G06F 16/28 | (2019.01) |
| G06Q 10/105 | (2023.01) |
| H04L 61/4552 | (2022.01) |
| H04L 67/306 | (2022.01) |

(52) U.S. Cl.
CPC ......... *G06F 16/282* (2019.01); *G06Q 10/105* (2013.01); *H04L 61/4552* (2022.05); *H04L 67/306* (2013.01)

(58) Field of Classification Search
CPC . G06F 16/282; G06Q 10/105; H04L 61/1552; H04L 67/306
USPC ........................................................ 707/705
See application file for complete search history.

(56) References Cited

U.S. PATENT DOCUMENTS

| | | | |
|---|---|---|---|
| 6,985,905 B2 | 1/2006 | Prompt et al. | |
| 7,185,361 B1 | 2/2007 | Ashoff et al. | |
| 8,706,692 B1* | 4/2014 | Luthra | G06F 16/27 707/622 |
| 10,986,081 B1* | 4/2021 | McAdams | H04L 63/0815 |
| 2003/0145003 A1 | 7/2003 | Yellepeddy et al. | |
| 2005/0096048 A1* | 5/2005 | Clare | H04W 12/062 455/433 |
| 2009/0276297 A1 | 11/2009 | Ehrler et al. | |
| 2010/0064353 A1* | 3/2010 | Kan | H04L 63/1408 726/5 |
| 2012/0246112 A1* | 9/2012 | Gonzalez | G06F 16/178 707/610 |

(Continued)

OTHER PUBLICATIONS

Sun Microsystems, Inc., "Chapter 1: Meta-Directory Concepts," Sun One Meta-Directory 5.1.1 Deployment Guide, 2004, accessed Feb. 21, 2019, 12 pages. https://docs.oracle.com/cd/E19130-01/816-6338-10/overview.html.

(Continued)

*Primary Examiner* — Raquel Perez-Arroyo
(74) *Attorney, Agent, or Firm* — Foley & Lardner LLP

(57) ABSTRACT

Managing enterprise data, comprising creating a human resources (HR) database and creating a lightweight directory access protocol (LDAP) interface in communication with the HR database and a number of heterogeneous external directories. User data is managed and synchronized through the LDAP interface across the number of heterogeneous external directories, wherein the LDAP interface serves as a proxy for requests between the external directories and the HR database, and wherein the LDAP interface maintains authorization credentials with the external directories.

24 Claims, 7 Drawing Sheets

(56) References Cited

U.S. PATENT DOCUMENTS

| | | | |
|---|---|---|---|
| 2014/0156684 A1 | 6/2014 | Zaslavsky et al. | |
| 2015/0006415 A1 | 1/2015 | Xu et al. | |
| 2016/0098666 A1 | 4/2016 | Hojby et al. | |
| 2017/0300547 A1 | 10/2017 | Jose | |
| 2017/0310672 A1* | 10/2017 | Sakura | H04L 63/20 |

OTHER PUBLICATIONS

Oracle Corporation, "Oracle Virtual Directory 11g," Oracle Data Sheet, copyright 2009, 3 pages. https://www.oracle.com/technetwork/testcontent/virtual-directory-ds-132980.pdf.

Oracle Corporation, "Aggregate Data From the HR LDAP Directory and the Administration LDIF File," Sun Directory Server Enterprise Edition 7.0 Administration Guide, 2010, accessed Feb. 21, 2019, 3 pages. https://docs.oracle.com/cd/E19424-01/820-4809/join-ldap-ldif/index.html.

PCT International Search Report and Written Opinion, dated Jun. 4, 2020, regarding PCT/US2020/019891, 8 pages.

Biasotti et al., "Oracle Fusion Middleware, Administrator's Guide for Oracle Virtual Directory," May 2009, retrieved from the Internet: https://docs.oracle.com/cd/E12839_01/admin.1111/e10046.pdf on Nov. 7, 2022 (374 pages).

Extended European Search Report issued in corresponding EP Application No. 20766534, dated Nov. 8, 2022 (8 pages).

International Preliminary Report on Patentability issued in corresponding International Application No. PCT/US2020/019891, dated Sep. 7, 2021 (7 pages).

\* cited by examiner

| | | | | | |
|---|---|---|---|---|---|
| ☰ Google Admin | 🔍 Search for users or settings | | ⑧ ? | ▦ ◯ Ⓔ | |

Users

| All organizations ≪ | Users \| Showing users from all organizational units | | | | ⇲ ⌕ |
|---|---|---|---|---|---|
| ⦿ Users from all organizational units | ⊕ Add a filter  502 | | | | |
| ◯ Users from selected organizational units | ☐ Name ↑ | Email | Status | Last Sign in | Ema ⚙ |
| *Search for organizational units* 504 | ☐ ⓘ Aakash Davis | aakash.davis@corp.com | Active | Hasn't signed in | 0 GB |
| Select multiple | ☐ ⓘ Aaron Smith | aaron.smith@corp.com | Active | Hasn't signed in | 0 GB |
| ▸ corp.com | ☐ ⓘ Abigail Murphy | abigail.murphy@corp.com | Active | Hasn't signed in | 0 GB |
|    Administrators | ☐ ⓘ Adam Tillman | adam.tillman@corp.com | Active | Hasn't signed in | 0 GB |
|    Service Accounts | ☐ ⓘ Adam Brown | adam.brown@corp.com | Active | Hasn't signed in | 0 GB |
| | ☐ ⓘ Adrian Jones | adrian.jones@corp.com | Active | Hasn't signed in | 0 GB |
| 510 | ☐ ⓘ Aimee Black | aimee.black@corp.com | Active | Hasn't signed in | 0 GB |
| | ☐ ⓘ Aimel Matthews | aimel.matthews@corp.com | Active | Hasn't signed in | 0 GB |
| | ☐ ⓘ Ajay Jonson | ajay.jonson@corp.com | Active | Hasn't signed in | 0 GB |
| | ☐ ⓘ Amelia Smith | amelia.smith@corp.com | Active | Hasn't signed in | 0 GB |
| | Rows per page: 50 ▾ | | |◁ Page 1 of many ≪ | |
| MANAGE ORGANIZATIONAL UNITS | | | | | |

≡ Google Admin | 🔍 Search for users or settings     ⊗ ? ⊞ ⌂ Ⓔ

Users > Aakash Davis

Aakash Davis
aakash.davis@corp.com

Active
Last sign in: Hasn't signed in
Created: Nov 21, 2018

Organizational Unit
corp.com

🔑 RESET PASSWORD
✏ RENAME USER
··· MORE

← 602

Mail storage
0 GB

Drive Storage
0 GB

Docs owned
0

← 604

User Information
Secondary email
*Add a secondary email*

Phone number | Work
555-555-1234

Address | Work
123 W. Main St. New York
New York 10011 United
States of America

Employee ID
100234

Manager's email
jane.doe@corp.com

Department
People Operations

User details

↙ 606

Security
2-step verification: OFF
Not enforced and not
enabled for Aakash

Application-specific
password
0 application-specific
passwords created

Connected application
0 applications are connected
with Aakash's account

Password settings | Application integrations

↙ 608

Groups
Member of 1 group

Owner of 0 groups

Manager of 0 groups

INDUSTRY STANDARD INTERFACE FOR MAINTENANCE OF ENTERPRISE SYSTEMS

BACKGROUND INFORMATION

1. Field

The present disclosure relates generally to an improved computer system and, in particular, to synchronizing and managing enterprise data across multiple third party directories.

2. Background

An enterprise directory holds information on the resources in an enterprise. These resources can include user, groups, and hardware. Users and organizations might employ a wide variety of commoditized enterprise tools and directories to assist them in their day-to-day work, such as communications, productivity, and file management software. These different tools do not communicate with each other and might be implemented differently. All require organization data to be input, requiring the customer to set up and manage their access and entitlement across multiple systems.

Managing multiple such tools requires regular manual updating of each system for routine organizational updates including, for example, creating new directory users when new employees are hired, removing users when employment ends, changing attributes (e.g., user name) on directory resources, and creating lists or groups of users in a directory.

SUMMARY

An illustrative embodiment provides a computer-implemented method for managing enterprise data. The method comprises creating a human resources (HR) database and creating a lightweight directory access protocol (LDAP) interface in communication with the HR database and a number of heterogeneous external directories. User data is managed and synchronized through the LDAP interface across the number of heterogeneous external directories, wherein the LDAP interface serves as a proxy for requests between the external directories and the HR database, and wherein the LDAP interface maintains authorization credentials with the external directories.

Another illustrative embodiment provides a system for managing enterprise data. The system comprises a bus system, a storage device connected to the bus system, wherein the storage device stores program instructions, and a number of processors connected to the bus system, wherein the number of processors execute the program instructions to: create a human resources (HR) database; create a lightweight directory access protocol (LDAP) interface in communication with the HR database and a number of heterogeneous external directories; and manage and synchronize associate identity data through the LDAP interface across the number of heterogeneous external directories, wherein the LDAP interface serves as a proxy for requests between the external directories and the HR database, wherein the LDAP interface maintains authorization credentials with the external directories.

Another illustrative embodiment provides a computer program product for managing enterprise data. The computer program product comprises a non-volatile computer readable storage medium having program instructions embodied therewith, the program instructions executable by a number of processors to cause the computer to perform the steps of: creating a human resources (HR) database; creating a lightweight directory access protocol (LDAP) interface in communication with the HR database and a number of heterogeneous external directories; and managing and synchronizing user data through the LDAP interface across the number of heterogeneous external directories, wherein the LDAP interface serves as a proxy for requests between the external directories and the HR database, wherein the LDAP interface maintains authorization credentials with the external directories.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 illustrates a user interface for managing organizational units in accordance with an illustrative embodiment;

FIG. 6 illustrates a user interface for managing an individual user data in accordance with an illustrative embodiment;

DETAILED DESCRIPTION

The illustrative embodiments recognize and take into account one or more different considerations. For example, the illustrative embodiments recognize and take into account that organizations employing multiple external enterprise directories have to continually update and manage data across multiple systems which might be implemented differently and all require organization data. Such management across multiple systems is laborious and time consuming.

The illustrative embodiments further recognize and take into account that manually managing and updating decentralized data across multiple systems can result in data that is inconsistent and not synchronized across these systems.

The illustrative embodiments further recognize and take into account that time delays between employment termination and updating of directory user access creates potential securities risks to an organization.

Illustrative embodiments provide an interface that allows users to automatically synchronize updated user and organization data across multiple external systems using a singular point of access while maintaining authorization with those external systems.

Figure 1:
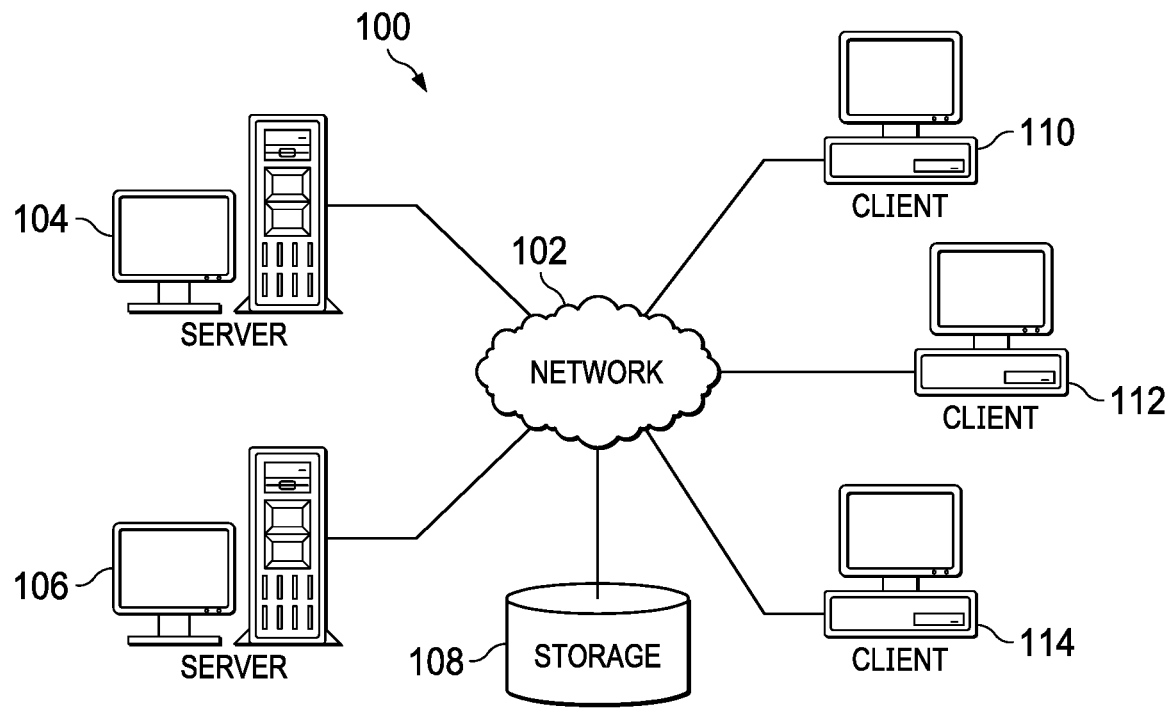
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
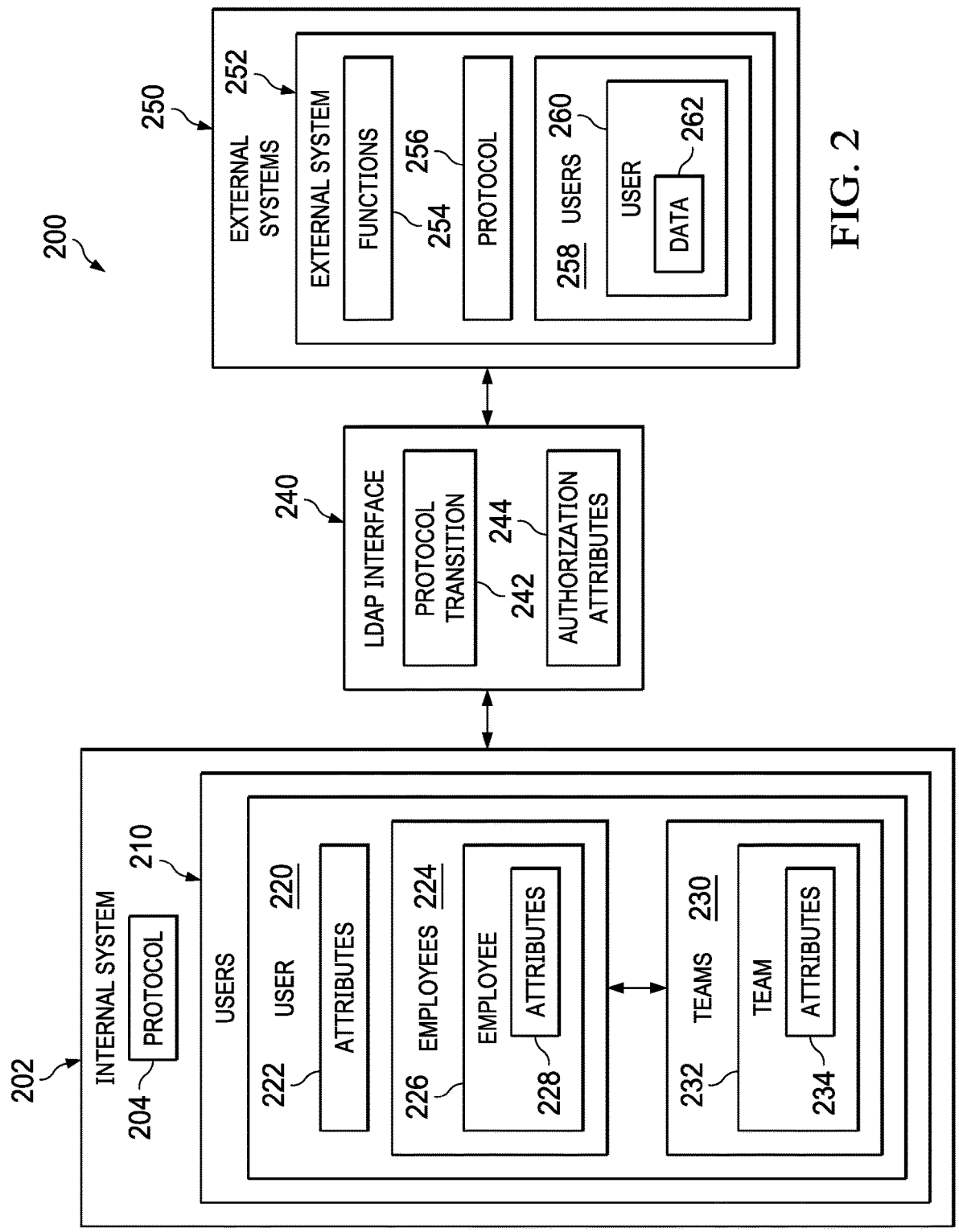
FIG. 2 is a block diagram of a computer system for managing and synchronizing enterprise data across multiple external systems is in accordance with an illustrative embodiment.

Turning to FIG. 2, a block diagram of a computer system for managing and synchronizing enterprise data across multiple external systems is depicted in accordance with an illustrative embodiment. System 200 comprises an internal system 202 such as, for example, a human resources (HR) database or similar platform. Through a lightweight directory access protocol (LDAP) interface 240, the internal system 202 can populate, update, and synchronize enterprise data across multiple external systems 250.

The internal system 202 can be an HR platform or database with its own communications protocol 204. The internal system 202 can have multiple users 210 can be individuals or organizations. In an illustrative example, the user 220 among users 210 is an organization that has multiple employees 224. Each employee 226 among employees 224 has a set of attributes 228. These attributes can include personal identifying information as well as position and responsibilities within the user organization 220, including access privileges to enterprises services such as external systems 250.

Groups of employees within a user organization 220 can be organized into different teams 230. Each team 232 within teams 230 has its own attributes 234, which define the membership and function of the team within the organization including access privileges of the team to enterprise services such as external systems 250. Access privileges to external systems listed in the attributes 228 of an employee can depend from the attributes 234 of a team 232 to which the employee belongs. Furthermore, an employee 226 might belong to multiple teams within team 230.

The LDAP interface 240 provides a singular point of access for users 210 of internal system 202 to manage, update, and synchronize enterprise data across multiple external systems 250 through the Transmission Control Protocol/Internet Protocol (TCP/IP) protocol stack. LDAP 240 interface serves as a system of record data source LDAP is a request-response application protocol for accessing and maintaining distributed directory services. The LDAP interface 240 serves as a central repository for authorization attributes 244, including usernames and passwords and other access credentials. LDAP interface 240 provides a protocol transition 242 between the protocol 204 of internal system 202 and protocol 256 of external system 252, which might differ from the protocols from other systems among external systems 250.

LDAP interface 240 acts as a layer over the internal HR system 202 that acts as a proxy for requests between the internal system 202 and external systems 250. LDAP interface 240 presents data on the external systems 250 as close to the original as possible. By maintaining authorization attributes and credentials 244 on an on-demand basis, LDAP interface 240 enabling the HR system to be the source of truth for the external systems 250 and saving users 210 from having to continually log into the external systems 250 or being timed out of a session.

External systems 250 comprise third party enterprise directories providing a plurality of services to users 210. External systems 250 can be heterogeneous directories, which can be implemented differently from each other. Each external system 252 within external systems 250 has unique functions 254. Examples of functions 254 include communications (e.g., email and messaging), productivity, and file management. External system also has its own protocol, which can be different from protocols from the other external systems.

External system 252 includes users 258. Users 258 can include individuals, organizations, or teams within organizations. User 260 among users 258 has data 262 stored on the external system 252. User data 252 is maintained and synchronized across the external directories 250 according to business logic-specified directory tools associated with the external directories.

LDAP interface 240 maps users 258 listed in the external directories 250 to users 210 listed in the internal HR database 202. LDAP interface 240 can also map employee groupings (teams) in the external directories 250 to teams 230 listed in the HR database 202.

Figure 3:
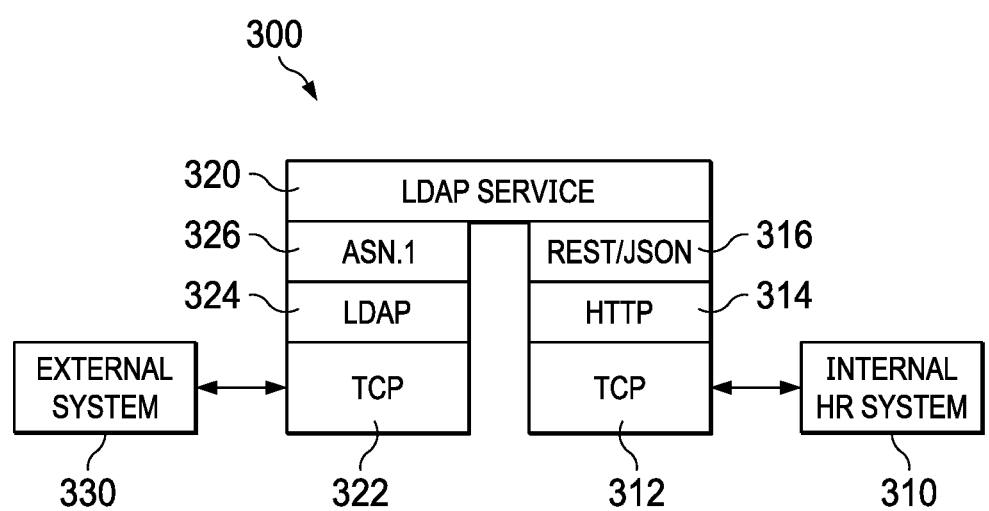
FIG. 3 is a block diagram of data synchronization between an internal platform and external enterprise system in accordance with an illustrative embodiment.

FIG. 3 is a block diagram of data synchronization between an internal platform and external enterprise system in accordance with an illustrative embodiment. This diagram illustrates how the LDAP interface handles the protocol transition between external and internal systems.

The internal HR system 310 connects to the LDAP Service 320 through TCP 312 and hypertext transfer protocol (HTTP) 314. Representation state transfer/JavaScript Object Notation (REST/JSON) 316 provides stateless browser-to-server communications to provide interoperability between systems.

The LDAP service 320 uses the LDAP protocol 324 built on abstract syntax notation one (ASN.1) 326 to synchronize data received from internal HR system 310 with external system through TCP protocol 322.

Figure 4:
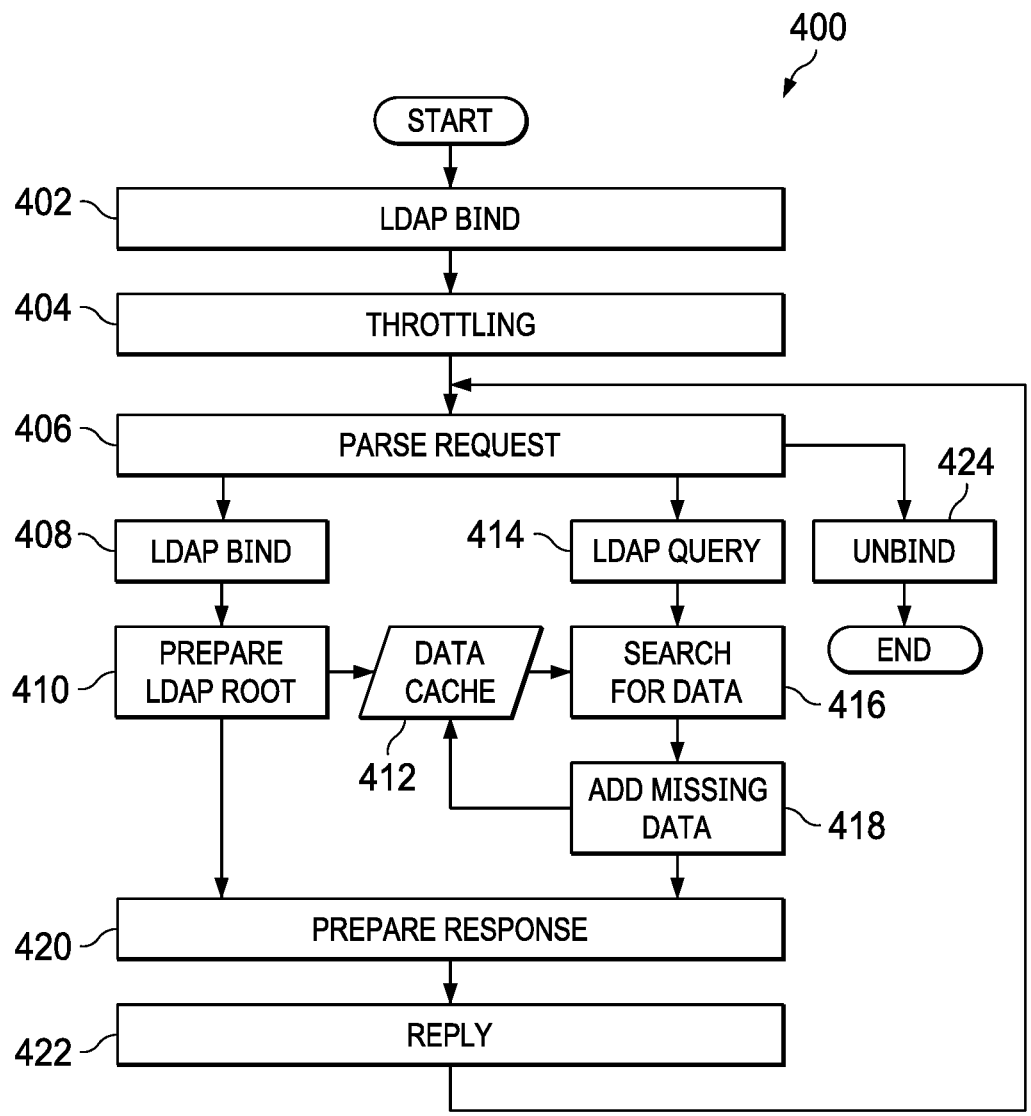
FIG. 4 depicts a process flow for synchronizing data across multiple external systems through a LDAP interface in accordance with an illustrative embodiment.

FIG. 4 depicts a process flow for synchronizing data across multiple external systems through a LDAP interface in accordance with an illustrative embodiment. Process 400 begins with an LDAP bind operation which authenticates the client system to the LDAP interface (step 402). After successful authentication, the LDAP interface institutes throttling to limit how fast data will be transferred through the service, which prevents the service from using all available bandwidth (step 404).

The interface then parses a request from the client and initiates an LDAP bind with the external directories (step 408) and prepares the LDAP root directory (step 410) to access the data cache 412 in an external directory. The LDAP interface submits an LDAP query to an external directory (step 416).

In response to the LDAP query, the external directory searches for data in the data cache 412 (step 416). If information from the client request is not found in the external direction, the external directory adds the missing data to the cache (step 418) and prepares a response (step 420). A reply is then sent to the LDAP interface denoting that the external directory has been updated in accordance with the client request (step 422).

If there is no more new data to update and synchronize across the external directories, the LDAP interface unbinds from the client (step 424), the process ends.

FIG. 5 illustrates a user interface for managing organizational units in accordance with an illustrative embodiment. Interface 500 includes a selector 510 that allows an administrator to select between displaying all members of an organization or just those from specific organizational units within the organization.

In the example shown in FIG. 5, the administrator has selected all users within the organization. These users are displayed in a list 502 comprising user names and other identifying data within the organization. Next to each user is a selection box 504 that allows the administrator to select a user in question to add the user to a particular enterprise directory.

FIG. 6 illustrates a user interface for managing an individual user data in accordance with an illustrative embodiment. Interface 600 includes an identification field 602 listing the individual user in question. User information field 606 comprises detailed user information such as email, home address, employee identification, department, etc.

Resource usage field 604 show how much of directory resources available to the user have been used. Security field 608 indicates the security settings and policies that have been set for the user. Field 610 indicates which groups or teams with the organization to which the user belongs.

Figure 7:
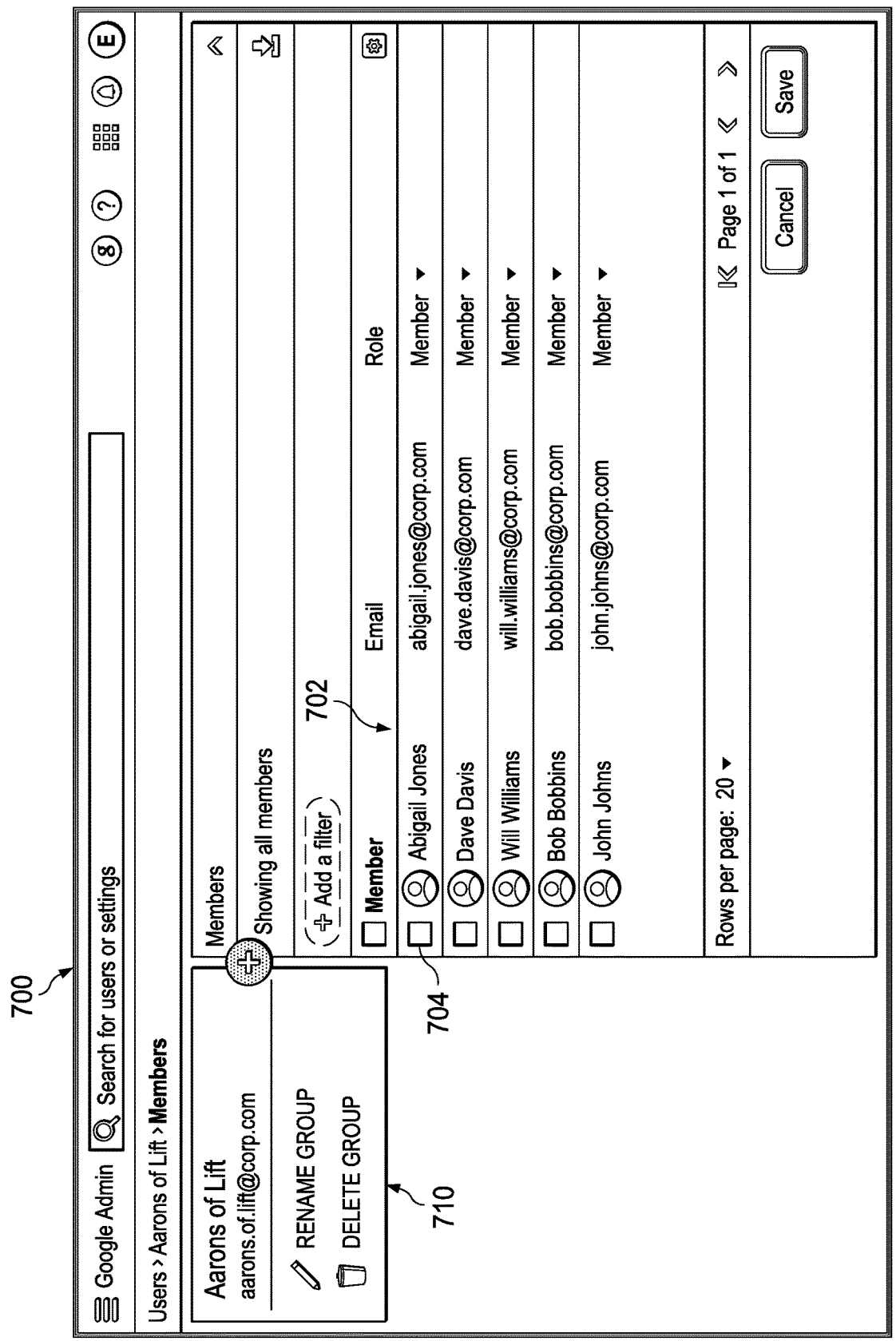
FIG. 7 illustrates a user interface for managing teams in accordance with an illustrative embodiment.

FIG. 7 illustrates a user interface for managing teams in accordance with an illustrative embodiment. Interface 700 displays a profile of a group or team identified in field 710. All members assigned to the team are shown in list 702. Next to each user is a selection box 704 that allows the administrator to select a team member to make a change such as, e.g., removing the member from the team, changing user security settings, etc.

Interface 500 and interface 700 allow an administrator to define a team comprising a subset of user profiles selected from the HR database and select a subset of external directories that are accessible by members of the team through the LDAP interface.

Figure 8:
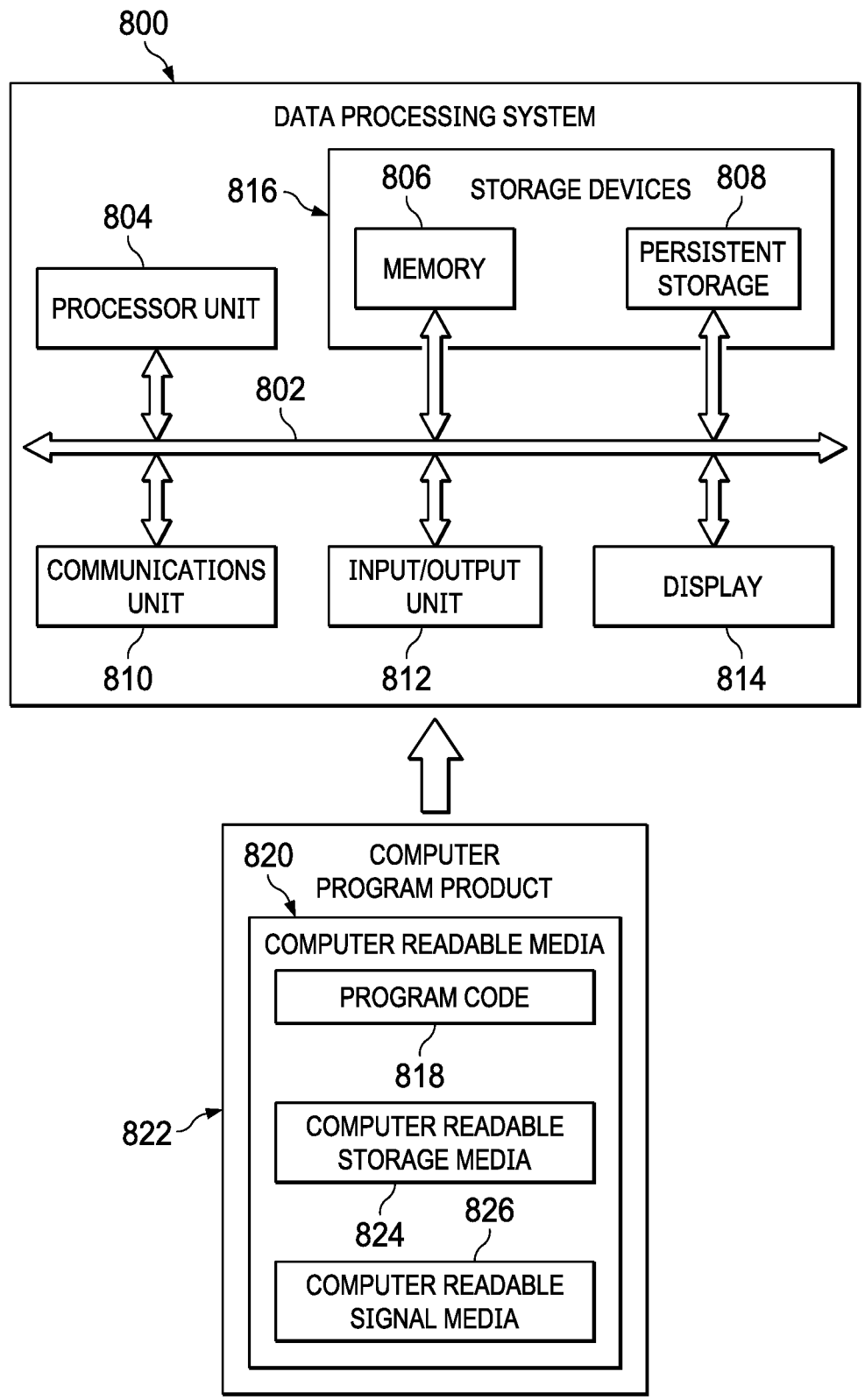
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement one or more computers and client computer system 112 in FIG. 1. In this illustrative example, data processing system 800 includes communications framework 802, which provides communications between processor unit 804, memory 806, persistent storage 808, communications unit 810, input/output unit 812, and display

814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 816, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described.

For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for managing enterprise data, the method comprising:
   creating, by a number of processors, a human resources (HR) database;
   creating, by the number of processors, a lightweight directory access protocol (LDAP) interface in communication with the HR database and a number of third party heterogeneous external directories, wherein each third party heterogenous external directory has a unique function and a protocol different from functions and protocols of other third party heterogenous external directories, wherein the unique function includes communications, productivity, and file management;
   searching, by the number of processors, user data indicated by a user request through the LDAP interface across the number of third party heterogeneous external directories using an LDAP protocol and using the LDAP interface to limit data transfer speed to prevent the LDAP interface from using all available bandwidth, wherein the LDAP interface binds with the number of third party heterogeneous external directories for accessing a data cache of the number of third party heterogenous external directories to serve as a proxy for requests between the number of third party heterogenous external directories and the HR database, and wherein the LDAP interface maintains authorization credentials with the number of third party heterogenous external directories;
   submitting, by the number of processors via the LDAP interface, a query to the number of third party heterogenous external directories, wherein the query causes the number of third party heterogeneous external directories to search the user data in the data cache of the number of third party heterogenous external directories;
   receiving, by the number of processors via the LDAP interface responsive to the query, a reply from the number of third party heterogenous external directories, wherein the reply denotes an update to the number of third party heterogenous external directories in accordance with the query;
   defining a team comprising a subset of user profiles selected from among a number of user profiles in the HR database; and
   selecting a subset of third party heterogenous external directories from among the number of third party heterogenous external directories that are accessible by the team through the LDAP interface.

2. The method of claim 1, wherein the user data is maintained and synchronized across the number of third party heterogenous external directories according to business logic-specified directory tools associated with the number of third party heterogenous external directories.

3. The method of claim 1, wherein the LDAP interface serves as a system of record data source.

4. The method of claim 1, further comprising:
   mapping users listed in the number of third party heterogenous external directories to users listed in the HR database.

5. The method of claim 1, further comprising:
   mapping employee groupings in the number of third party heterogenous external directories to teams listed in the HR database.

6. The method of claim 1, wherein the LDAP interface maintains the authorization credentials with the number of third party heterogenous external directories on an on-demand basis.

7. The method of claim 1, wherein the LDAP interface provides a protocol transition between the HR database and the number of third party heterogenous external directories.

8. The method of claim 1, wherein a user comprises one of:
   an individual user;
   an organization; or
   a team of individuals.

9. A system for managing enterprise data, the system comprising:
   a bus system;
   a storage device connected to the bus system, wherein the storage device stores program instructions; and
   a number of processors connected to the bus system, wherein the number of processors execute the program instructions to:
   create a human resources (HR) database;
   create a lightweight directory access protocol (LDAP) interface in communication with the HR database and a number of third party heterogeneous external directories, wherein each third party heterogenous external directory has a unique function and a protocol different from functions and protocols of other third party heterogenous external directories, wherein the unique function includes communications, productivity, and file management;
   search associate identity data indicated by a user request through the LDAP interface across the number of third party heterogeneous external directories using an LDAP protocol and use the LDAP interface to limit data transfer speed to prevent the LDAP interface from using all available bandwidth, wherein the LDAP interface binds with the number of third party heterogeneous external directories for accessing a data cache of the number of third party heterogenous external directories to serve as a proxy for requests between the number of third party heterogenous external directories and the HR database, and wherein the LDAP interface maintains authorization credentials with the number of third party heterogenous external directories;
   submit, via the LDAP interface, a query to the number of third party heterogenous external directories, wherein the query triggers the number of third party heterogeneous external directories to search the user data in the data cache of the number of third party heterogenous external directories;
   receive, via the LDAP interface, a reply from the number of third party heterogenous external directories, wherein the reply denotes an update to the number of third party heterogenous external directories in accordance with the query;
define a team comprising a subset of user profiles selected from among a number of user profiles in the HR database; and
select a subset of third party heterogenous external directories from among the number of third party heterogenous external directories that are accessible by the team through the LDAP interface.

10. The system of claim 9, wherein the user data is maintained and synchronized across the number of third party heterogenous external directories according to business logic specified directory tools associated with the number of third party heterogenous external directories.

11. The system of claim 9, wherein the LDAP interfaces serves as a system of record data source.

12. The system of claim 9, further comprising:
mapping users listed in the number of third party heterogenous external directories to users listed in the HR database.

13. The system of claim 9, further comprising:
mapping employee groupings in the number of third party heterogenous external directories to teams listed in the HR database.

14. The system of claim 9, wherein the LDAP interface maintains the authorization credentials with the number of third party heterogenous external directories on an on-demand basis.

15. The system of claim 9, wherein the LDAP interface provides a protocol transition between the HR database and the number of third party heterogenous external directories.

16. The system of claim 9, wherein a user comprises one of:
an individual user;
an organization; or
a team of individuals.

17. A computer program product for managing enterprise data, the computer program product comprising:
a non-volatile computer readable storage medium having program instructions embodied therewith, the program instructions executable by a number of processors to cause a computer to perform the steps of:
creating a human resources (HR) database;
creating, by the number of processors, a lightweight directory access protocol (LDAP) interface in communication with the HR database and a number of third party heterogeneous external directories, wherein each third party heterogeneous external directory has a unique function and a protocol different from functions and protocols of other third party heterogenous external directories, wherein the unique function includes communications, productivity, and file management;
searching, by the number of processors, user data indicated by a user request through the LDAP interface across the number of third party heterogeneous external directories using an LDAP protocol and using the LDAP interface to limit data transfer speed to prevent the LDAP interface from using all available bandwidth, wherein the LDAP interface binds with the number of third party heterogeneous external directories for accessing a data cache of the number of third party heterogenous external directories to serve as a proxy for requests between the number of third party heterogenous external directories and the HR database, and wherein the LDAP interface maintains authorization credentials with the number of third party heterogenous external directories;
submitting, by the number of processors via the LDAP interface, a query to the number of third party heterogenous external directories, wherein the query causes the number of third party heterogeneous external directories to search the user data in the data cache of the number of third party heterogenous external directories;
receiving, by the number of processors via the LDAP interface responsive to the query, a reply from the number of third party heterogenous external directories, wherein the reply denotes an update to the number of third party heterogenous external directories in accordance with the query;
defining a team comprising a subset of user profiles selected from among a number of user profiles in the HR database; and
selecting a subset of third party heterogenous external directories from among the number of third party heterogenous external directories that are accessible by the team through the LDAP interface.

18. The computer program product according to claim 17, wherein the user data is maintained and synchronized across the number of third party heterogenous external directories according to business logic specified directory tools associated with the number of third party heterogenous external directories.

19. The computer program product according to claim 17, wherein the LDAP interface serves as a system of record data source.

20. The computer program product according to claim 17, further comprising:
mapping users listed in the number of third party heterogenous external directories to users listed in the HR database.

21. The computer program product according to claim 17, further comprising:
mapping employee groupings in the number of third party heterogenous external directories to teams listed in the HR database.

22. The computer program product according to claim 17, wherein the LDAP interface maintains the authorization credentials with the number of third party heterogenous external directories on an on-demand basis.

23. The computer program product according to claim 17, wherein the LDAP interface provides a protocol transition between the HR database and the number of third party heterogenous external directories.

24. The computer program product according to claim 17, wherein a user comprises one of:
an individual user;
an organization; or
a team of individuals.

* * * * *